(12) United States Patent
Maurmaier et al.

(10) Patent No.: US 10,747,211 B2
(45) Date of Patent: Aug. 18, 2020

(54) METHOD FOR ENGINEERING A METHOD- OR PROCESS-ENGINEERING PLANT, FUNCTION MODULE AND STORED PROGRAM CONTROL

(71) Applicant: Siemens Aktiengesellschaft, Munich (DE)

(72) Inventors: Mathias Maurmaier, Gerlingen (DE); Andreas Stutz, Eggenstein-Leopoldshafen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/596,829

(22) Filed: May 16, 2017

(65) Prior Publication Data
US 2017/0336782 A1 Nov. 23, 2017

(30) Foreign Application Priority Data
May 17, 2016 (EP) .................................... 16170003

(51) Int. Cl.
G06F 9/44 (2018.01)
G05B 19/418 (2006.01)
G05B 19/05 (2006.01)

(52) U.S. Cl.
CPC ....... *G05B 19/4187* (2013.01); *G05B 19/056* (2013.01); *G05B 2219/36186* (2013.01)

(58) Field of Classification Search
CPC ....... G06F 8/10–78; G06F 9/44–45558; G05B 19/4187; G05B 19/056; G05B 2219/36186
See application file for complete search history.

(56) References Cited

U.S. PATENT DOCUMENTS 7,151,966 B1 12/2006 Baier et al.
8,849,431 B2 * 9/2014 Thomson ........... G05B 19/0426 700/23

(Continued)

FOREIGN PATENT DOCUMENTS

CN 101702119 5/2010
CN 103207592 7/2013

(Continued)

OTHER PUBLICATIONS

Office Action dated Apr. 16, 2019 issued in Chinese Patent Application No. 201710345493.6.

(Continued)

*Primary Examiner* — Wissam Rashid
(74) *Attorney, Agent, or Firm* — Cozen O'Connor

(57) ABSTRACT

A method for engineering a method- or process-engineering plant with at least one function module, a corresponding function module and a stored program control, wherein the function module includes the stored program control and the method- or process-engineering module that can be controlled or regulated thereby fur use as part of the plant, where a parameter-configurable user program is loaded into the stored program control, and information for the integration of the function module in a file is provided, during engineering of the plant, which defines the parameters for the application-specific configuration of the function module via a plant-engineering tool and stored via an interface specified in a formal description language, for configuration of the user program, in a memory area of the control such that an engineering tool, which is specific to the respective stored program controls used within function modules, is advantageously no longer required.

6 Claims, 3 Drawing Sheets

(56) References Cited

U.S. PATENT DOCUMENTS

| 9,229,440 | B2* | 1/2016 | Blei | G05B 19/054 |
|---|---|---|---|---|
| 2006/0130038 | A1* | 6/2006 | Claussen | G06F 9/4492 |
| | | | | 717/168 |
| 2013/0144406 | A1* | 6/2013 | Blei | G05B 19/054 |
| | | | | 700/28 |
| 2016/0062602 | A1 | 3/2016 | Davis | |

FOREIGN PATENT DOCUMENTS

| CN | 103336491 | 10/2013 |
| DE | 10 2010 026 494 A1 | 1/2012 |
| JP | 2004-126817 | 4/2004 |

OTHER PUBLICATIONS

Office Action dated Feb. 25, 2020 issued in Chinese Patent Application No. 201710345493.6.

\* cited by examiner

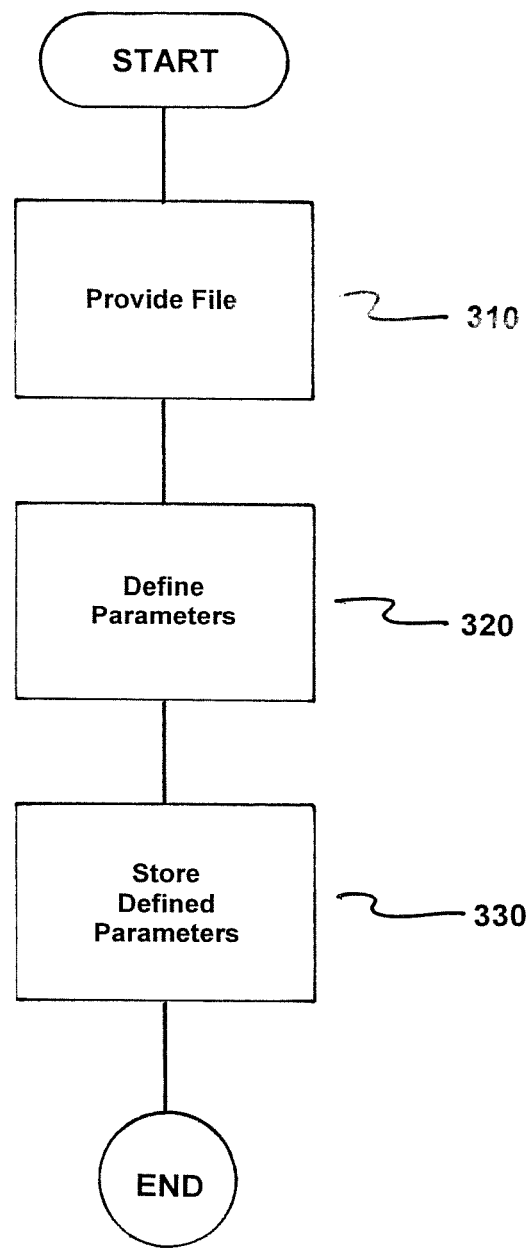

METHOD FOR ENGINEERING A METHOD- OR PROCESS-ENGINEERING PLANT, FUNCTION MODULE AND STORED PROGRAM CONTROL

BACKGROUND OF THE INVENTION

1. Field of the Invention

The invention relates to a method for engineering a method- or process-engineering plant with at least one function module, where the function module comprises a stored program control (SPC) and a method- or process-engineering module that can be controlled and/or regulated via the SPC for use as a part of a plant. The invention further relates to a function module for use in a method of this kind and an SPC for the function module of this kind.

2. Description of the Related Art

In order to perform engineering of the automation of a method- or process-engineering plant, hereinafter plant for short, typically in a plant engineering tool, in a first step, the structure of the plant is acquired and the tool is used to compile a P&I diagram of the plant or of parts of the plant by linking graphic process objects. The graphic process objects represent the components required for the operation of the plant, such as sensors, motors, pumps, valves, pipelines, tanks, or reactors, or they represent function modules, which are increasingly used during the course of the growing modularization of method- or process-engineering plants. The trend in method and process engineering is moving toward modules with defined basic operations and their provision as functional units "function modules". With respect to simplicity of implementation of the functional aspects of modules from the viewpoint the engineering of the automation, it is advantageous for the function modules to be equipped with their own intelligence in the form of an SPC. The controls that can be used for this, often also called programmable logic controllers (PLCs), under some circumstances, may originate from different manufacturers and hence function modules used in a plant can be equipped with divergent controls made by different manufacturers. To engineer the plant, the user then disadvantageously has to be able to hold available and use engineering tools from all the manufacturers of controls used in function modules of the respective plant. The integration of the function modules and the modification or adaptation of functions of the modules at the time of their integration in the plant are therefore disadvantageously associated relatively high costs.

U.S. Pat. No. 8,849,431 B2 discloses a method for configuring an application program for an SPC with the aid of a file containing information on a desired number of instances and on a desired module configuration of the user program. Here, the configuration file is loaded into the SPC by a manufacturer-specific configuration device. This has the drawback in that it is once again necessary to hold available configuration devices from the different manufacturers to engineer the plant.

SUMMARY OF THE INVENTION

In view of the foregoing, it is therefore an object of the invention to provide a method for engineering a method- or process-engineering plant with at least one function module in a low cost manner. It is a further object to provide a function module for use when implementing the method and an SPC for the function module.

These and other objects and advantages are achieved in accordance with the invention by an engineering method, a function module, a stored program control (SPC) by which a method- or process-engineering plant with a plurality of function modules, which can be equipped with controls from different manufacturers, can be advantageously engineered without the respective manufacturer-specific engineering tools from the manufacturers of the controls. When engineering the plant, the user of the plant no longer has to deal with the different engineering tools from the manufacturers of the plants and no longer has to acquire the specialized knowledge required to operate these tools. The user can now advantageously make do with one single plant engineering tool for engineering the plant.

The engineering of the function module, which is provided to be used in the plant, can be performed on the manufacturers' premises. The manufacturer of the function module can, for its part, use special engineering tools for this which are specific for the respective manufacturer of the SPC used in the module. Hence, the manufacturer of the module is given full access to the project planning for the control during the automation of the function module.

On the other hand, a user of the function module does not have to be given complete access to the project planning for the SPC of the function module for engineering of the respective plant in which the module will be used and in particular for the integration of the function module in the plant. Certain parameters disclosed by the manufacturer of the module to the user enable the different functional services of the module implemented by the manufacturer of the module to be activated and/or parameterized thus enabling individualization of the function module in accordance with user requirements.

To this end, the manufacturer of the function module comprises a parameter-configurable user program for a SPC that is freely programmable at the time of the compilation of the program. This occurs at the manufacturer's premises via a tool formed for engineering the respective SPC and hence for engineering the function module provided with the SPC. The tool is used to translate the user program compiled in this way and for the program to be downloaded by the manufacturer of the module into the SPC. The SPC is now provided with a parameter-configurable user program. During the translation of the user program, the module engineering tool, which is formed for engineering the SPC, enables a file containing the parameters with which the user program can be configured to be automatically compiled in a formal description language as information for the integration of the function module. In an advantageous way, this procedure also enables the know-how of the manufacturer of the module to be protected because, although the user program can be configured by the user of the function module, the user does not have to be able to read or change the user program.

To select and define the parameters for an application-specific configuration of the function module via the plant-engineering tool, a user only requires knowledge of the parameters and the method that can be used to configure and parameterize the function module for a desired function. This knowledge can be obtained from the file with the information for the integration of the function module. The parameters can, for example, be defined by user inputs into a plant engineering tool with a menu-driven user interface. As a result of the file that has previously been read-in with the information for the integration of the function module, with menu guidance, a user can advantageously be prompted to input precisely those parameters that can be used to configure the respective user program in the SPC of the function module. This further simplifies engineering of the plant. The storage of the parameters previously defined via the plant-engineering tool in the SPC of the function module concludes the process of the configuration of the user program.

If the interface used to access the plant-engineering tool for storing the parameters in the data memory of the SPC is formed as a remote procedure call (RPC) interface and specified by a description in Electronic Device Description Language (EDDL), it is advantageously possible to use technologies that are known and proven from the "field of field device integration". It is now also possible for any engineering tools for field device integration that may already be available to a user to be used for the integration of the function modules in plants.

In this context, the embodiment of the memory area provided in the SPC for the parameters for the application-specific configuration of the function module as a data register that can be accessed via the RPC interface advantageously enables the configuration of the function module also to be changed during the operating time of plant so that, under some circumstances, it is possible to dispense with plant standstills, and, hence, with costly interruptions to the processes running on the plant in order to make changes or adaptations.

In accordance with a particularly advantageous embodiment of the method, the parameters with which the user program can be configured are provided in the user program with corresponding identifications by which, on the translation of the user program, the parameters can automatically be extracted from the user program so that in each case storage locations can be automatically reserved for the parameters in the memory area of the SPC. The above-described identification of the parameters can be performed particularly simply in that the parameters are each assigned an attribute in the user program identifying these as belonging to the information for the integration of the function module.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and embodiments and advantages are described below with reference to the drawings which depict an exemplary embodiment of the invention, in which:

FIG. 3 is a flowchart of the method in accordance with the invention.

DETAILED DESCRIPTION OF THE EXEMPLARY EMBODIMENTS

Figure 1:
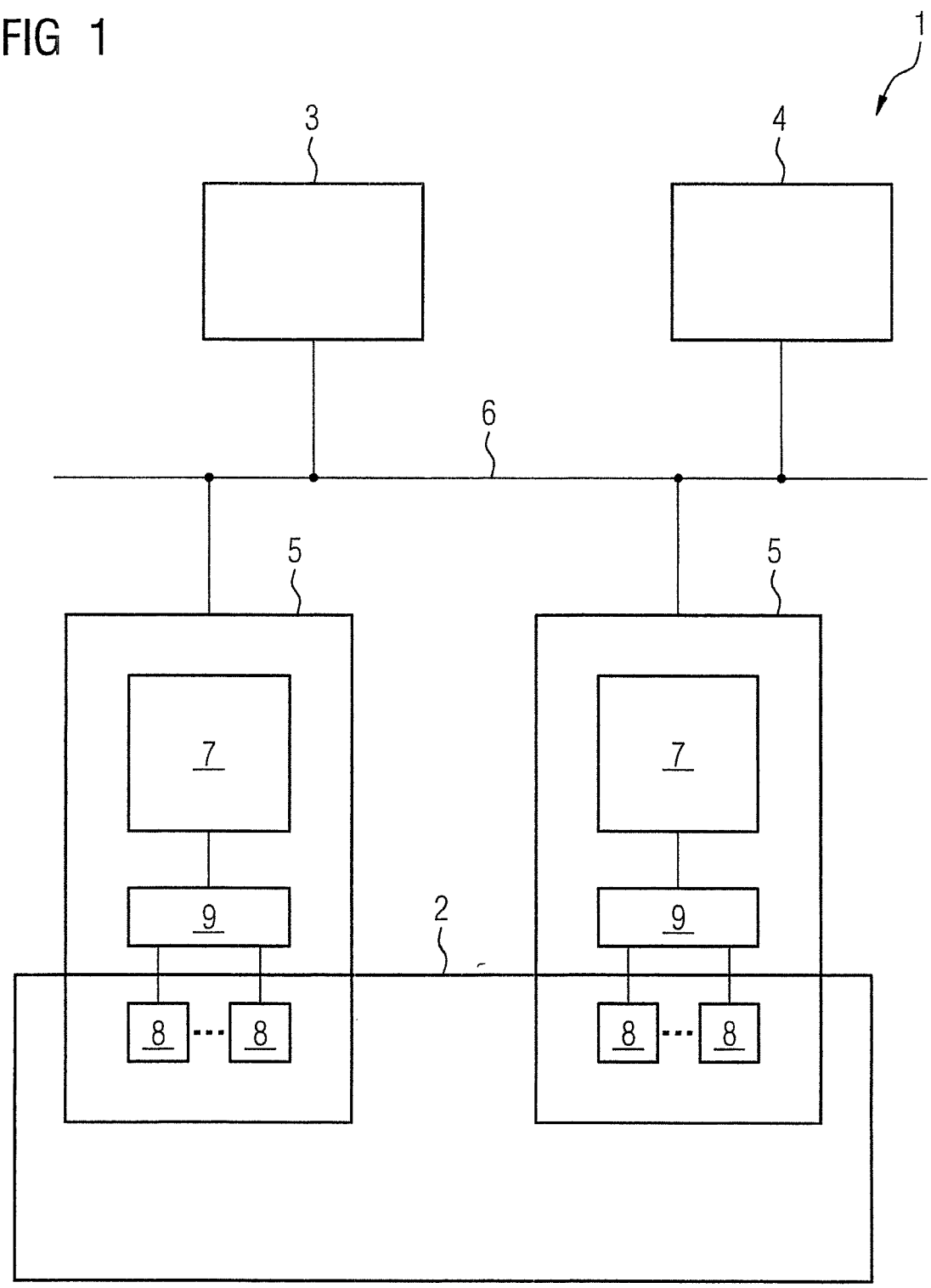
FIG. 1 an example of a method- or process-engineering plant.

FIG. 1 is a simplified schematic depiction of an exemplary plant 1 in which a process 2 is controlled by an automation system. The automation system comprises an engineering tool 3, an operating and monitoring device 4 and a plurality of function modules 5 connected to one another via a bus system 6 for data communication. For purposes of clarity, only two function modules 5 are depicted. The function modules 5 control the process 2 in accordance with configurable user programs executing in stored program controls 7 of the modules 5. Moreover, in order to control the process 2, use is made of various field devices 8, which, for example, are connected via devices 9, i.e., decentralized I/O devices, to the controls 7. The field devices 8 can be measuring transducers used to acquire process variables, such as the temperature, pressure, flow rate, fill level, density or gas concentration of a medium. The field devices 8 can also be actuators that are able to influence the process sequence dependent on process variables corresponding to the specifications of the configured user programs executing in the controls 7. Examples of actuators are control valves, heating or a pump.

Figure 2:
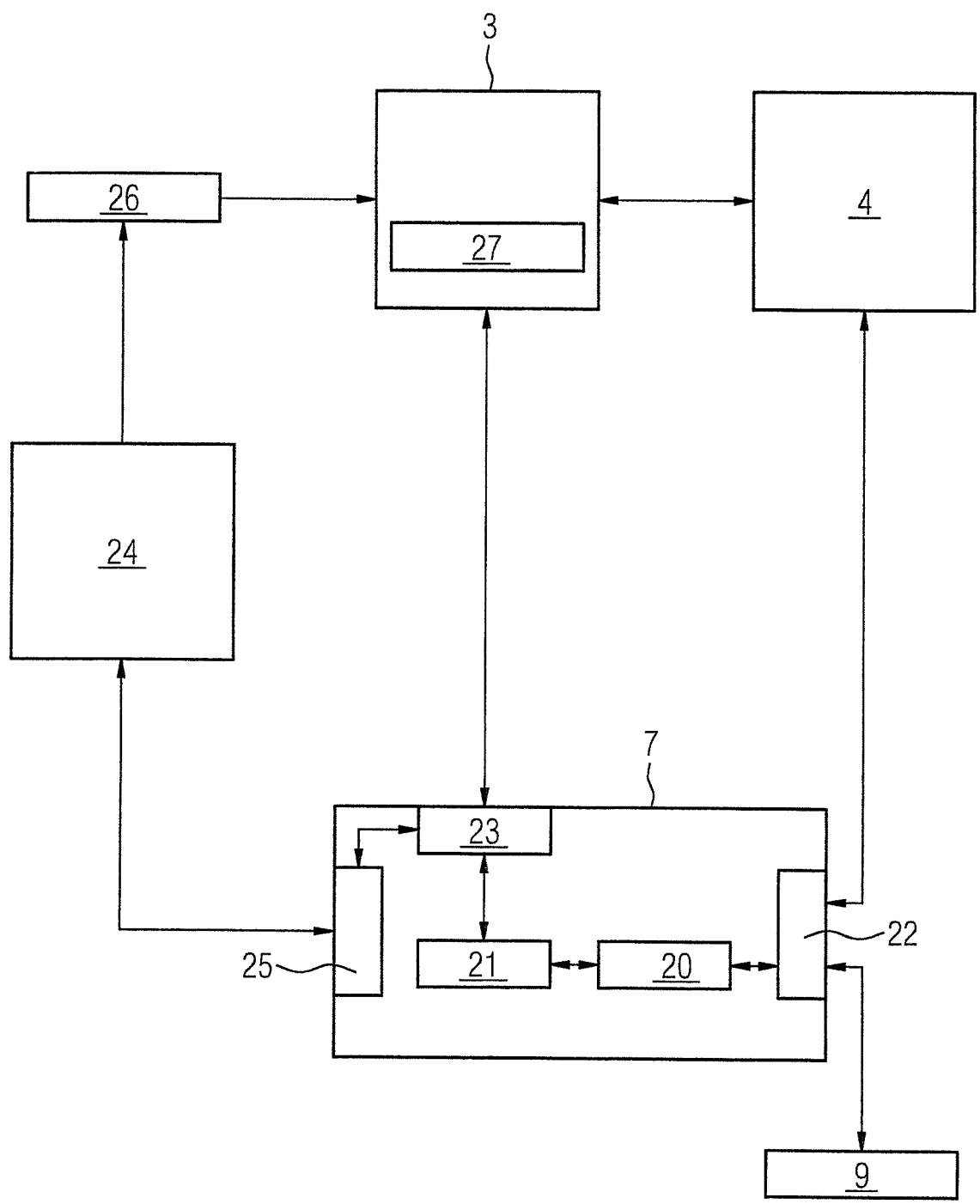
FIG. 2 a block diagram to elucidate the engineering of the plant.

In FIG. 2, the components of a plant introduced in FIG. 1 are given the same reference numbers.

According to the exemplary embodiment shown in FIG. 2, the configuration of a user program 20 of an SPC 7 is enabled by the use of an acyclic data register 21 which can be requested and described within the SPC by the configurable user program 20 to enable the user program 20 to have data access to the configuration parameters available therefor. The user program 20 can be freely programmed by the manufacturer of a module, but later, following delivery to the user of the module, depending on the manufacturer's specifications, possibly protected against unauthorized reading or amendment, to enable the protection of know-how. In the case of cyclic processing of the user program 20 in the SPC 7, changes to the data register 21 are also requested cyclically. This is comparable with the access of the user program 20 to a process map 22, which is maintained for the process inputs and outputs of the SPC 7. An RPC interface 23 enables the engineering tool 3, provided for the plant engineering, to have acyclic access to the data register 21. The RPC interface 23 is specified in an interface description in a formal description language. The interface description can be implemented using languages known from field device integration. One suitable language is, for example, electronic device description language (EDDL).

For engineering the actual module at the premises of the manufacturer of the module at which, inter alia, the configurable user program 20 is compiled, it is possible for a module-engineering tool 24 to be used that is specific for the manufacturer of SPC 7 and uses a similarly manufacturer-specific engineering-interface 25 of the SPC 7 for accessing the SPC 7. Parameters with the definition of which the user program 20 can be configured can be marked by assigning corresponding attributes in the user program 20. The following is an example of a program line suitable therefor EDDL_GROUP:="FC1013-Dosage Control"

in the definition of a list of system attributes of a function block or

EDDL:="true"

in the block for the definition of an input variable or an output variable intended to be part of the RPC interface 23. Hence, in the user program 20 in accordance with the present exemplary embodiment, the configuration parameters are marked by a defined flag. At the premises of the manufacturer of the module, the module-engineering tool 24 translates the finished user program provided in the engineering tool 24 as a source code and downloads the program into the SPC 7 as an executable user program 20. On translation, the parameters are determined, for example, using the flags, and storage locations provided for the variables in the acyclic data register 21. In order to enable the assigned storage locations also to be made known to the plant engineering tool 3, during the translation, it is also possible for a file 26 to be compiled containing the parameters in a formal description language, such as EDDL, as information for the later integration of the module equipped with the SPC 7 in a plant (1 in FIG. 1). The provision of the file 26 for use in plant engineering takes place offline, for example by storing the file 26 in a database of the manufacturer of the module, which a user is able to access during plant engineering. After the completion of the module, the user program 20 can be individualized via configuration. Hence, for the plant engineering, the user is provided with an SPC 7 with a parameter-configurable user program 20 and with a data register 21 for the parameters for the configuration of the user program 20. The user is also provided with a file containing the parameters in a formal description language as information for integration of the function module. Hence, during the engineering of the plant, the individualization and adaptation of the function module advantageously no longer requires any engineering tools specific to the manufacturer of the SPC 7.

The engineering of the plant is advantageously performed with the plant engineering tool 3. This can contain a tool 27 for the integration of the device, where the tool can be formed similarly to the tool Simatic PDM, which is already known for field device integration. For plant engineering, a user typically already has an integration tool 27 of this kind, which can now also be used for the integration of the function module in the plant. The parameters in the acyclic data register 21 are defined by the user with the aid of the plant-engineering tool 3 based on the file 26 written to the data register 21 via the RPC interface 23. Decoupling this access to the data register 21 from the cyclic data access by the user program 20 advantageously enables the configuration of the user program 20 during the run-time thereof. Possible configurations are, for example, blocking or releasing messages and the activation, deactivation, adaptation of functional parts of the user program 20. Advantageously, a user no longer requires any control-specific engineering tools for configuration and adaptation of the function modules in the plant but is able to use an engineering tool 3, which is independent of the controls 7 used by the manufacturers of the controls used in the function modules, to configure all the function modules used in a plant.

Additionally to the configuration of the user program 20, the RPC interface 23 specified with a formal description language can also be used for the transmission of diagnostic data for the SPC 7 or the user program 20.

A function module is generally used to perform a basic method- or process-engineering operation or reaction. Here, it is possible to differentiate between whether this entails an auxiliary process implemented by a package unit or a function used in the active reaction. It is also possible for a function module to be used within a discrete or hybrid plant. An example of a module consisting of a hybrid plant is a filling machine. In this case, the actual production process can be formed as a continuous process or as a batch process.

A further example of a function module is a temperature-stabilizing module performing the function of heating or cooling an object, such as by circulating water around the object. For example, in the case of the implementation of a module of this type with a double-walled glass reactor, the module represents a method- or process-engineering module to be used as part of the plant. If the glass reactor is operated in a warm environment, the temperature loss on heating is much less than with operation in a cold environment. This results in discrepant system time constants and, hence, in different regulator parameterization. To date, a corresponding adaptation of the regulator parameters could not be implemented without a manufacturer-specific engineering system for the SPC. With the engineering method in accordance with the invention it is, on the other hand, possible for the configuration and re-parameterization of the function module to be performed with an engineering tool that is independent of the respective manufacturer of the SPC.

The situation is similar in the case of a function module for metering in a process engineering plant. Regulator parameters for pumps or flow rate regulation depend upon the viscosity of a medium to be metered. Viscous media cannot be pumped with the same flow rate as, for example, water. These differences can be transferred to the user program 20 by parameterization via the RPC interface 23 without using a manufacturer-specific engineering tool.

The engineering method in accordance with the invention can advantageously be used in all cases in which an automatic control engineering function is to be parameterized in accordance with the environment. The engineering method in accordance with the invention offers manufacturers of function modules the advantage that they only have to program the user program 20 for the function module once to implement the desired functions. The adaptation and integration of the function module in the respective plant can occur by the parameterizing the function module via a manufacture-independent engineering tool 3. Manufacturers of function modules are also given the possibility of implementing know-how protection but, as a result of the parameterization, still retain high flexibility in the use of the function module. This advantageously makes it possible to prevent anyone making unauthorized changes directly to the user program 20, for example due to insufficient knowledge that could possibly result in disruption to the operation of the plant.

FIG. 3 is a flowchart of the for engineering a method- or process-engineering plant 1 with at least one function module 5 comprising a stored program control 7 and a method- or process-engineering module which is controlled or regulated via the stored program control 7 to be used as part of the plant, the stored program control 7 comprising at least one parameter-configurable user program 20, a memory area 21 provided for parameters for an application-specific configuration of the at least function module 5 and an interface 23, which is specified by a description in a formal description language and by which the memory area 21 with parameters can be described.

The method comprises providing a file 26 corresponding to the at least one parameter-configurable user program 20 in which the parameters are contained in a formal description language as information for integration of the at least one function module 5, as indicated in step 310.

Next, the file 26 with the information for integration of the at least one function module in a tool 3 formed for engineering of the plant 1 is read-in, as indicated in step 320.

Next, the parameters for the application-specific configuration of the function module 5 are defined via the plant-engineering tool 3, as indicated in step 330.

The previously defined parameters via the plant-engineering tool 3 are now stored in the memory area 21 by access via the interface 23, as indicated in step 340.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for engineering a method- or process-engineering plant with at least one function module comprising (i) a stored program control and (ii) a method- or process-engineering module which is controlled or regulated via the stored program control to be used as part of the plant, the stored program control comprising (i) at least one parameter-configurable user program, (ii) a memory area provided for parameters for an application-specific configuration of the at least function module and (iii) an interface, which is specified by a description in a formal description language and by which the memory area with parameters is describable, the method comprising:

providing, prior to integration of the at least one function module, a file corresponding to the at least one parameter-configurable user program in which the parameters are contained in a formal description language as information for integration of the at least one function module, said at least one function module comprising (i) the stored program control and (ii) the method- or process-engineering module which is controlled or regulated via the stored program control;

reading-in the file with the information for integration of the at least one function module in a tool formed for engineering of the plant;

defining the parameters for the application-specific configuration of the function module via the plant-engineering tool;

storing previously defined parameters via the plant-engineering tool in the memory area by access via the interface; and engineering and operating the plant including the at least one function module, said at least one function module comprising (i) the stored program control and (ii) the method- or process-engineering module which is controlled or regulated via the stored program control.

2. The method as claimed in claim 1, wherein the interface is configured as a remote procedure call (RPC) interface and specified by a description in accordance with electronic device description language.

3. The method as claimed in claim 2, wherein the memory area comprises a data register that is accessible acyclically via the RPC interface.

4. The method as claimed in claim 1, wherein the parameters by which the user program is configurable are provided in source code of the user program with corresponding identifications; and wherein, via an module-engineering tool formed for engineering the stored program control, during the translation of source codes into a user program which is loadable into the stored program control, the corresponding identifications enable the parameters by which the user program can be configured to be determined and in each case storage cells to be reserved in the memory area for the parameters.

5. The method as claimed in claim 4, wherein, in the user program, the parameters by which the user program can be configured are each assigned an attribute identifying the parameters as belonging to the information for the integration of the function module.

6. A function module, comprising:

a stored program control and a method- or process-engineering module which is controlled and/or regulated via the stored program control to be used as part of a plant subsequent to engineering and during operation of said plant;

wherein the stored program control comprises:

at least one parameter-configurable user program, which is provided as a file prior to integration of the function module, a memory area provided for parameters for an application-specific configuration of the function module, and an interface, which is specified by a description in a formal description language and by which the memory area with parameters is describable; and wherein the function module is configured such that:

prior to integration of said function module, the at least one parameter-configurable user program in which the parameters are contained in the formal description language as information is provided as the file and utilized for integration of the function module;

the file with the information is read-out for integration of the module in a tool formed for engineering of the plant;

the parameters for the application-specific configuration of the function module are defined via the plant-engineering tool;

previously defined parameters are stored via the plant-engineering tool in the memory area by access via the interface; and the plant including the function module is engineered and operated.

* * * * *